United States Patent
Yokomakura et al.

(10) Patent No.: US 11,943,169 B2
(45) Date of Patent: Mar. 26, 2024

(54) BASE STATION APPARATUS, TERMINAL APPARATUS, COMMUNICATION METHOD, AND INTEGRATED CIRCUIT

(71) Applicant: SHARP KABUSHIKI KAISHA, Sakai (JP)

(72) Inventors: Kazunari Yokomakura, Sakai (JP); Shohei Yamada, Sakai (JP); Hidekazu Tsuboi, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 114 days.

(21) Appl. No.: 16/960,793

(22) PCT Filed: Jan. 11, 2019

(86) PCT No.: PCT/JP2019/000754
§ 371 (c)(1),
(2) Date: Jul. 8, 2020

(87) PCT Pub. No.: WO2019/139139
PCT Pub. Date: Jul. 18, 2019

(65) Prior Publication Data
US 2021/0067304 A1  Mar. 4, 2021

(30) Foreign Application Priority Data
Jan. 11, 2018 (JP) ................. 2018-002524

(51) Int. Cl.
H04L 5/00 (2006.01)
H04W 72/23 (2023.01)
(52) U.S. Cl.
CPC ........... *H04L 5/0057* (2013.01); *H04W 72/23* (2023.01)

(58) Field of Classification Search
CPC ... H04L 5/0057; H04L 5/0094; H04L 5/0023; H04L 5/001; H04W 72/042;
(Continued)

(56) References Cited

U.S. PATENT DOCUMENTS

| 9,019,847 | B2 | 4/2015 | Ko et al. |
| 2013/0100906 | A1 | 4/2013 | Yano et al. |

(Continued)

FOREIGN PATENT DOCUMENTS

| WO | 2011/161744 A1 | 8/2013 | |
| WO | WO-2017078601 A1 * | 5/2017 | ........... H04L 5/0023 |

OTHER PUBLICATIONS

3GPP, "TS38.321 V15.2.0 NR Medium Access Control Specification Release 15," Jun. 2018, p. 61, section 6.1.3.13.*
(Continued)

*Primary Examiner* — Charles C Jiang
*Assistant Examiner* — Ryan C Kavleski
(74) *Attorney, Agent, or Firm* — ScienBiziP, P.C.

(57) ABSTRACT

To efficiently transmit CSI. A receiver configured to receive a physical downlink control channel for conveying downlink control information including a first information field and a transmitter configured to report channel state information (CSI) are included, wherein the first information field indicates first information, the first information indicates one of multiple states, each of the multiple states is associated with a configuration related to one or multiple CSI reports and a configuration related to one or multiple CSI resources, and the one of the multiple states is configured to be associated with a first serving cell and a bandwidth part (BWP) of the first serving cell.

3 Claims, 10 Drawing Sheets

(58) Field of Classification Search
CPC ..... H04W 48/12; H04W 24/10; H04W 72/23; H04B 7/063; H04B 7/0626
See application file for complete search history.

(56) References Cited

U.S. PATENT DOCUMENTS

| | | | |
|---|---|---|---|
| 2017/0195031 A1 | 7/2017 | Onggosanusi et al. | |
| 2019/0149213 A1* | 5/2019 | Zhou | H04L 5/0092 370/329 |
| 2019/0200396 A1* | 6/2019 | Agiwal | H04W 28/20 |
| 2019/0215781 A1* | 7/2019 | Jeon | H04W 52/325 |
| 2019/0215870 A1* | 7/2019 | Babaei | H04L 5/0098 |
| 2019/0296805 A1* | 9/2019 | Son | H04W 76/27 |
| 2020/0037260 A1* | 1/2020 | Fu | H04W 72/042 |
| 2020/0280357 A1* | 9/2020 | Bae | H04B 7/0626 |
| 2022/0039099 A1* | 2/2022 | Faxér | H04W 72/542 |

OTHER PUBLICATIONS

3GPP TS 38.214 V15.0.0 (Dec. 2017) Brd Generation Partnership Project; Technical Specification Group Radio Access Network; NR; Physical layer procedures for data (Release 15).
ERICSSON: "On remaining details of CSI measurement", R1-1720733 3GPP TSG-RAN WG1 #91, Reno, USA, Nov. 27-Dec. 1, 2017.
NTT Docomo: "Revision of SI: Study on New Radio Access Technology", RP-161214, 3GPP TSG RAN Meeting #72, Busan, Korea, Jun. 13-16, 2016.
3GPP TS 38.214 V1.3.0 (Dec. 2017) Brd Generation Partnership Project; Technical Specification Group Radio Access Network; NR; Physical layer procedures for data (Release 15).
Ericsson, "On remaining details of CSI reporting", R1-1720734, 3GPP TSG-RAN WG1 #91, Reno, USA, Nov. 27, 2017-Dec. 1, 2017, Nov. 18, 2017.

* cited by examiner

FIG. 6

RRC

$N_{CSI} = 3$
$N_{TS} = 2$

CONFIGURATION #0 RELATED TO CSI REPORT
- OPERATION IN TIME DOMAIN: PERIODIC
- PERIOD: 20 SLOTS
- BWP INDEX #1

CONFIGURATION #1 RELATED TO CSI REPORT
- OPERATION IN TIME DOMAIN: APERIODIC
- TRIGGER STATE #0
- BWP INDEX: active CONFIGURATION #2 RELATED TO CSI REPORT
- OPERATION IN TIME DOMAIN: APERIODIC
- TRIGGER STATE #1
- BWP INDEX #0

CONFIGURATION #3 RELATED TO CSI REPORT
- OPERATION IN TIME DOMAIN: APERIODIC
- TRIGGER STATE #2
- BWP INDEX #1

CSI REQUEST FIELD (DCI)

| VALUE | DESCRIPTION |
|---|---|
| 00 | DO NOT REPORT CSI |
| 01 | TRANSMIT CSI REPORT ASSOCIATED WITH TRIGGER STATE #0 |
| 10 | TRANSMIT CSI REPORT ASSOCIATED WITH TRIGGER STATE #1 |
| 11 | TRANSMIT CSI REPORT ASSOCIATED WITH TRIGGER STATE #2 |

FIG. 7

MAC LAYER

| TRIGGER STATE INDEX | #0 | #1 | #2 | #3 |
|---|---|---|---|---|
| 01 | 1 | 0 | 0 | 0 |
| 10 | 0 | 0 | 1 | 0 |
| 11 | 0 | 0 | 0 | 1 |

CSI REQUEST FILED (DCI)

| VALUE | DESCRIPTION |
|---|---|
| 00 | DO NOT REPORT CSI |
| 01 | TRIGGER STATE SELECTED IN MAC LAYER |
| 10 | TRIGGER STATE SELECTED IN MAC LAYER |
| 11 | TRIGGER STATE SELECTED IN MAC LAYER |

RRC

$N_{CSI} = 4$
$N_{TS} = 2$

CONFIGURATION #0 RELATED TO CSI REPORT
- OPERATION IN TIME DOMAIN: PERIODIC
- PERIOD: 20 SLOTS
- BWP INDEX #1

CONFIGURATION #1 RELATED TO CSI REPORT
- OPERATION IN TIME DOMAIN: APERIODIC
- TRIGGER STATE #0
- BWP INDEX: active CONFIGURATION #2 RELATED TO CSI REPORT
- OPERATION IN TIME DOMAIN: APERIODIC
- TRIGGER STATE #1
- BWP INDEX #0

CONFIGURATION #3 RELATED TO CSI REPORT
- OPERATION IN TIME DOMAIN: APERIODIC
- TRIGGER STATE #2
- BWP INDEX #1

CONFIGURATION #4 RELATED TO CSI REPORT
- OPERATION IN TIME DOMAIN: APERIODIC
- TRIGGER STATE #3
- BWP INDEX #0

CSI REQUEST FILED (DCI)

| VALUE | DESCRIPTION |
|---|---|
| 00 | DO NOT REPORT CSI |
| 01 | TRANSMIT CSI REPORT ASSOCIATED WITH TRIGGER STATE #0 OF SERVING CELL #1 AND TRIGGER STATE #0 OF SERVING CELL #2 |
| 10 | TRANSMIT CSI REPORT ASSOCIATED WITH TRIGGER STATE #1 OF SERVING CELL #1 AND TRIGGER STATE #1 OF SERVING CELL #2 |
| 11 | TRANSMIT CSI REPORT ASSOCIATED WITH TRIGGER STATE #2 OF SERVING CELL #1 AND TRIGGER STATE #2 OF SERVING CELL #2 |

RRC

SERVING CELL #1

$N_{CSI} = 3$
$N_{TS} = 2$

- CONFIGURATION #0 RELATED TO CSI REPORT
  - OPERATION IN TIME DOMAIN: PERIODIC
  - PERIOD: 20 SLOTS
  - BWP INDEX #1
- CONFIGURATION #1 RELATED TO CSI REPORT
  - OPERATION IN TIME DOMAIN: APERIODIC
  - TRIGGER STATE #0
  - BWP INDEX: active
- CONFIGURATION #2 RELATED TO CSI REPORT
  - OPERATION IN TIME DOMAIN: APERIODIC
  - TRIGGER STATE #1
  - BWP INDEX #0
- CONFIGURATION #3 RELATED TO CSI REPORT
  - OPERATION IN TIME DOMAIN: APERIODIC
  - TRIGGER STATE #2
  - BWP INDEX #1

SERVING CELL #2

$N_{CSI} = 3$
$N_{TS} = 2$

- CONFIGURATION #0 RELATED TO CSI REPORT
  - OPERATION IN TIME DOMAIN: SEMI-PERSISTENT
  - PERIOD: 10 SLOTS
  - BWP INDEX #1
- CONFIGURATION #1 RELATED TO CSI REPORT
  - OPERATION IN TIME DOMAIN: APERIODIC
  - TRIGGER STATE #0
  - BWP INDEX: active
- CONFIGURATION #2 RELATED TO CSI REPORT
  - OPERATION IN TIME DOMAIN: APERIODIC
  - TRIGGER STATE #1
  - BWP INDEX #0
- CONFIGURATION #3 RELATED TO CSI REPORT
  - OPERATION IN TIME DOMAIN: APERIODIC
  - TRIGGER STATE #2
  - BWP INDEX #1

FIG. 8

BASE STATION APPARATUS, TERMINAL APPARATUS, COMMUNICATION METHOD, AND INTEGRATED CIRCUIT

TECHNICAL FIELD

The present invention relates to a base station apparatus, a terminal apparatus, a communication method, and an integrated circuit. This application claims priority based on JP 2018-2524 filed on Jan. 11, 2018, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently conducted by the Third Generation Partnership Project (3GPP) (NPL 1).

The fifth generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

CITATION LIST

Non Patent Literature

NPL 1: RP-161214, NTT DOCOMO, "Revision of SI: Study on New Radio Access Technology", June 2016

SUMMARY OF INVENTION

Technical Problem

An object of an aspect of the present invention is to efficiently provide a terminal apparatus, a base station apparatus, a communication method, and an integrated circuit by the base station apparatus and the terminal apparatus in the above-mentioned radio communication systems.

Solution to Problem (1) To accomplish the object described above, aspects of the present invention are contrived to provide the following measures. Specifically, a terminal apparatus according to an aspect of the present invention includes; a receiver configured to receive a physical downlink control channel for conveying downlink control information including a first information field; and a transmitter configured to report channel state information (CSI), wherein the first information field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (BWP) of the first serving cell.

(2) A base station apparatus according to an aspect of the present invention includes; a transmitter configured to transmit a physical downlink control channel for conveying downlink control information including a first information field; and a receiver configured to receive a channel state information (CSI) report, wherein the first information field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (BWP) of the first serving cell.

(3) A communication method according to an aspect of the present invention is a comnunication method for a terminal apparatus, the communication method including the steps of: receiving a physical downlink control channel for conveying downlink control information including a first information field; and reporting channel state information (CSI), wherein the first information field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (MVP) of the first serving cell.

(4) A communication method according to an aspect of the present invention is a communication method for a base station apparatus, the communication method including the steps of: transmitting a physical downlink control channel for conveying downlink control information including a first information field; and reporting channel state information (CSI), wherein the first information field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (BWP) of the first serving cell.

(5) An integrated circuit according to an aspect of the present invention is an integrated circuit mounted on a terminal apparatus, the integrated circuit including: a receiving unit configured to receive a physical downlink control channel (PDCCH) for conveying downlink control information (DCI) including a first information field (CSI request field); and a transmitting unit configured to report channel state information (CSI), wherein the first inthrmation field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (BWP) of the first serving cell.

(6) A communication method according to an aspect of the present invention is an integrated circuit mounted on a base station apparatus, the integrated circuit including: a transmitting unit configured to transmit a physical downlink control channel (PDCCH) for conveying downlink control information (DCI) including a first information field (CSI request field); and a receiving unit configured to receive a channel state information (CSI) report, wherein the first information field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (BWP) of the first serving cell.

Advantageous Effects of Invention

According to the present invention, a base station apparatus and a terminal apparatus can efficiently communicate with each other.

BRIEF DESCRIPTION OF DRAWINGS

FIG. 6 is a diagram illustrating an example of a configuration of an aperiodic CSI report.

FIG. 7 is a diagram illustrating an example of a configuration of an aperiodic CSI report.

FIG. 8 is a diagram illustrating an example of a configuration of an aperiodic CSI report in a case that multiple serving cells are configured.

DESCRIPTION OF EMBODIMENTS

Embodiments of the present invention ill be described below.

Figure 1:
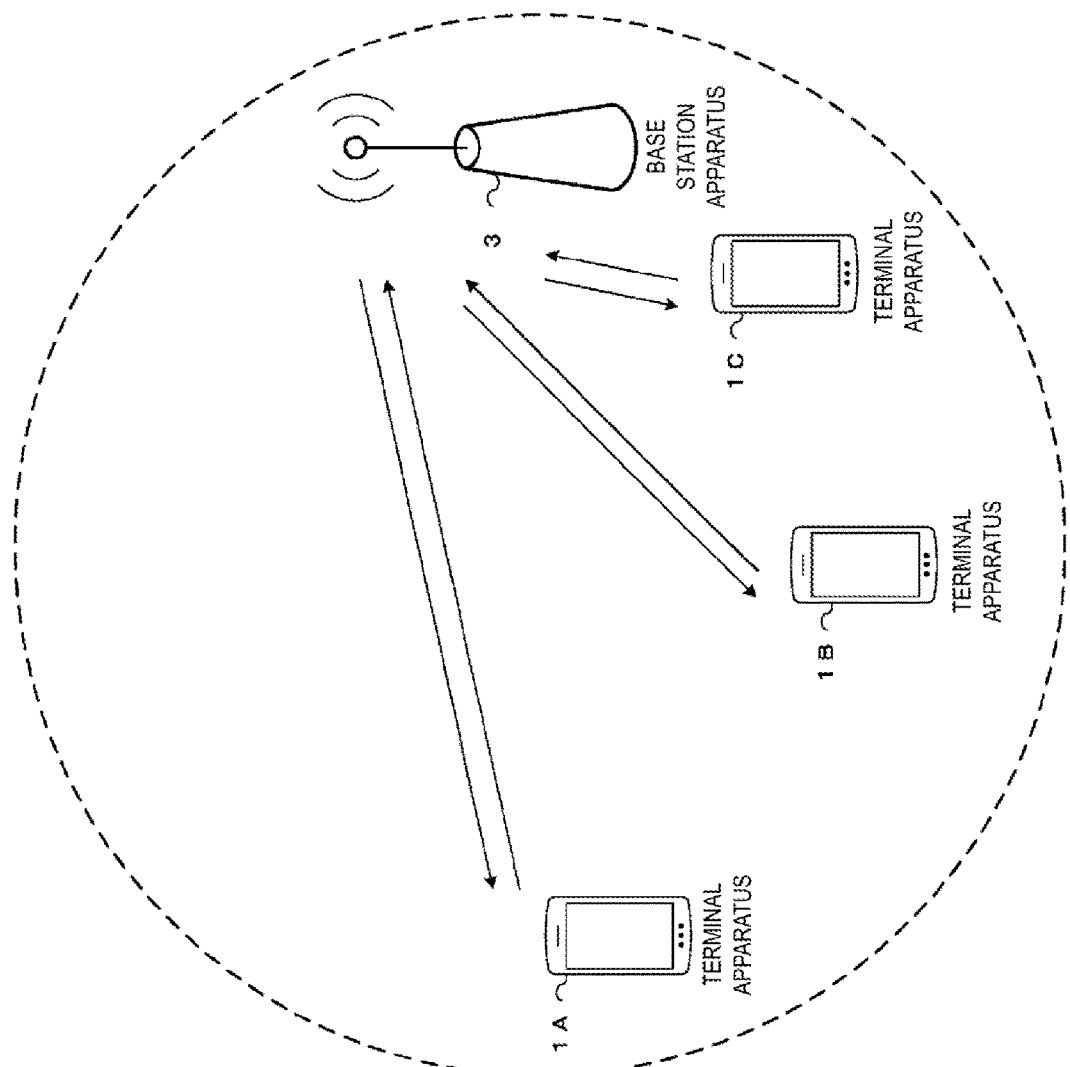
FIG. 1 is a diagram illustrating a concept of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. Each of the terminal apparatuses 1A to 1C is hereinafter also referred to as a terminal apparatus 1.

The terminal apparatus 1 is also referred to as a user terminal, a mobile station apparatus, a communication terminal, a mobile device, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

In FIG. 1, in the radio communication between the terminal apparatus 1 and the base station apparatus 3, Universal-Filtered Multi-Carrier (UFMC). Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, but use of any other transmission schemes described above is also included in the present invention.

In FIG. 1, in the radio communication between the terminal apparatus 1 and the base station apparatus 3, the CP may not be used, or the above-described transmission scheme with zero padding may be used instead of the CP. The CP or zero passing may be added both forward and backward.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

In FIG. 1, the following physical channels are used for the radio communication between the terminal apparatus 1 and the base station apparatus 3.

Physical Broadcast CHannel (PBCH)
Physical Downlink Control CHannel (PDCCH)
Physical Downlink Shared CHannel (PDCCH)
Physical Uplink Control CHannel (PDCCH)
Physical Uplink Shared CHannel (PUSCH)
Physical Random Access CHannel (PRACH)

The PBCH is used to broadcast essential information block ((Master Information Block (MIB), Essential Information Block (EIB), and Broadcast Channel (BCH)) which includes essential information needed by the terminal apparatus 1.

The PBCH may be used to broadcast a time index within a period of a block of a synchronization signal (also referred to as an SS/PBCH block), Here, the time index is inthrmation for indicating the index of the synchronization signal and the PBCH within the cell. For example, in a case that the SS/PBCH block is transmitted by using three transmit beams (transmission filter configuration, Quasi-CoLocation (QCL) for reception spatial parameters), the order of time within a predetermined period or within a configured period may be indicated. The terminal apparatus may recognize a difference in the time index as a difference in the transmit beam.

The PDCCH is used to transmit (or carry) Downlink Control information (DCI) in downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits.

For example, the following DCI formats may be defined.

DCI format 0_0
DCI format 0_1
DCI format 1_0
DCI format 1_1
DCI format 2_0
DCI format 2_1
DCI format 2_2
DCI format 2_3

DCI format 0_0 may include information for indicating scheduling information of the PUSCH (frequency domain resource allocation and time domain resource allocation).

DCI format 0_1 may include information for indicating scheduling information of the PUSCH (frequency domain resource allocation and time domain resource allocation), information for indicating a BandWidth Part (BWP), a Channel State Information (CSI) request, a Sounding Reference Signal (SRS) request, and information related to an antenna port.

DCI format 1_0 may include information for indicating scheduling information of the PUSCH (frequency domain resource allocation and time domain resource allocation).

DCI format 1_1 may include information for indicating scheduling information of the PUSCH (frequency domain resource allocation and time domain resource allocation), information for indicating a BandWidth Part (BWP), Transmission Configuration Indication (TCI), and information related to an antenna port.

DCI format 2_0 is used to notify the slot format of one or multiple slots. The slot format is defined as one in which each OFDM symbol in the slot is classified as downlink, flexible, or uplink. For example, in a case that the slot format is 28, DDDDDDDDDDDDXU is applied to 14 symbols of OFDM symbols in the slot in which slot format 28 is indicated. Here, D is a downlink symbol, X is a flexible symbol, and U is an uplink symbol. Note that the slot will be described below.

DCI format 2_1 is used to notify the terminal apparatus 1 of physical resource blocks and OFDM symbols which may be assumed to be without transmission. Note that this information may be referred to as a preemption indication (intermittent transmission indication).

DCI format 2_2 is used for transmission of the PUSCH and Transmit Power Control (TPC) commands for the PUSCH.

DCI format 2_3 is used to transmit a group of TPC commands for sounding reference signal (SRS) transmission by one or multiple terminal apparatuses 1. An SRS request may be transmitted together with the TPC commands. An SRS request and TPC commands may be defined in DCI format 23 for uplink with no PUSCH and PUCCH or uplink in which the transmit power control of the SRS is not associated with the transmit power control of the PUSCH.

The DCI for the downlink is also referred to as downlink grant or downlink assignment. Here, the DCI for the uplink is also referred to as uplink grant or uplink assignment.

The PUSCH is used to transmit Uplink Control Information (UCI) in uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ-ACK for downlink data (Transport block, Medium Access Control Protocol Data Unit (MAC PDU), or Downlink-Shared CHannel (DL-SCH)).

The PDSCH is used to transmit downlink data (Downlink Shared CHannel (DL-SCH)) from the Medium Access Control (MAC) layer. In a case of the downlink, the PSCH is used to transmit System Information (SI), a Random Access Response (RAR), and the like.

The PUSCH may be used to transmit the uplink data (Uplink Shared CHannel (UL-SCH)) from the MAC layer or HARQ-ACK and/or CSI with the uplink data. The PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive Radio Resource Control (RRC)) signaling (also referred to as a Radio Resource Control (RRC) message or Radio Resource Control (RRC) information) in an RRC layer. The base station apparatus 3 and the terminal apparatus 1 may transmit and/or receive a Medium Access Control (MAC) control element in a Medium Access Control (MAC) layer. Here, the RRC signaling and/or the MAC control element is also referred to as higher layer signaling. Since the higher layer here refers to a higher layer viewed from the physical layer, the higher layer may include one or multiple of a MAC layer, an RRC layer, an RLC layer, a PDCP layer, a Non Access Stratum (NAS) layer, or the like. For example, in a processing of the MAC layer, the higher layer may include one or multiple of an RRC layer, an RLC layer, a PDCP layer, a NAS layer, or the like.

The PDSCH and PUSCH may be used to transmit the RRC signaling and the MAC control element. Here, in the PDSCH, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PUSCH may be used to transmit UE Capabilities in the uplink.

In FIG. 1, the following downlink physical signals are used for downlink radio communication. Here, the downlink physical signals are not used to transmit information output from the higher layers but are used by the physical layer.

Synchronization signal (SS)

Reference Signal (RS)

The synchronization signal may include a Primary Synchronization Signal (PSS) and a Secondary Synchronization Signal (SSS). A cell ID may be detected by using the PSS and SSS.

The synchronization signal is used for the terminal apparatus 1 to establish synchronization in a frequency domain and a time domain in the downlink. Here, the synchronization signal may be used for the terminal apparatus 1 to select precoding or a beam in precoding or beamforming performed by the base station apparatus 3. Note that the beam may be referred to as a transmission or reception filter configuration.

A reference signal is used for the terminal apparatus 1 to perform channel compensation on a physical channel. Here, the reference signal is used for the terminal apparatus 1 to calculate the downlink CSI. The reference signal may be used for a numerology such as a radio parameter or subcarrier spacing, or used for fine synchronization that allows FFT window synchronization to be achieved.

According to the present embodiment, at least one of the following downlink reference signals are used.

Demodulation Reference Signal (DMRS)

Channel State Information Reference Signal (CSI-RS)

Phrase Tracking Reference Signal (PTRS)

Tracking Reference Signal (TRS)

The DMRS is used to demodulate a modulated signal. Note that two types of reference signals may be defined as the DMRS: a reference signal for demodulating the PBCH and a reference signal for demodulating the PDSCH, or that both reference signals may be referred to as the DMRS. The CSI-RS is used for measurement of Channel State Information (CSI) and beam management. The PTRS is used to track the phase in the time axis to ensure frequency offset due to phase noise. The TRS is used to ensure Doppler shift during fast travel. Note that the TRS may be used as one configuration of the CSI-RS. For example, a radio resource may be configured with one port of a CSI-RS as a TRS.

According to the present embodiment, any one or multiple of the following uplink reference signals are used.

Demodulation Reference Signal (DMRS)
Phrase Tracking Reference Signal (PTRS)
Sounding Reference Signal (SRS)

The DMRS is used to demodulate a modulated signal. Note that two types of reference signals may be defined as the DMRS: a reference signal for demodulating the PUCCH and a reference signal for demodulating the PUSCH, or that both reference signals may be referred to as the DMRS. The SRS is used for measurement of uplink channel state information (CSI), channel sounding, and beam management. The PTRS is used to track the phase in the time axis to ensure frequency offset due to phase noise.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in the Medium Access Control (MAC) layer is referred to as a transport channel. A unit of the transport channel used in the MAC layer is also referred to as a Transport Block (TB) and/or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The reference signal may also be used for Radio Resource Measurement (RRM). The reference signal may also be used for beam management.

Beam management may be a procedure of the base station apparatus 3 and/or the terminal apparatus 1 for matching directivity of an analog and/or digital beam in a transmission apparatus (the base station apparatus 3 in the downlink and the terminal apparatus 1 in the uplink) with directivity of an analog and/or digital beam in a reception apparatus (the terminal apparatus 1 in the downlink and the base station apparatus 3 in the uplink) to acquire a beam gain.

Note that the procedure described below may be included as a procedure for constituting, configuring, or establishing a beam pair link, Beam selection
Beam refinement
Beam recovery For example, the beam selection may be a procedure for selecting a beam in communication between the base station apparatus 3 and the terminal apparatus 1. The beam refinement may be a procedure for selecting a beam having a higher gain or changing a beam to an optimum beam between the base station apparatus 3 and the terminal apparatus 1 according to the movement of the terminal apparatus 1. The beam recovery may be a procedure for re-selecting the beam in a case that the quality of a communication link is degraded due to blockage caused by a blocking object, a passing human being, or the like in communication between the base station apparatus 3 and the terminal apparatus 1.

The beam management may include the beam selection or the beam refinement. The beam recovery may include the following procedures.

Detection of beam failure
Discovery of new beam
Transmission of beam recovery request
Monitor of response to beam recovery request For example, the Reference Signal Received Power (RSRP) of the SSS included in the CSI-RS or the SS/PBCH block may be used, or the CSI may be used, in selecting the transmit beam of the base station apparatus 3 in the terminal apparatus 1. The CSI-RS Resource Index (CRI) may be used, or an index indicated in the sequence of the demodulation reference signal (DMRS) used for demodulation of the PBCH and/or PBCH included in the SS/PBCH block may be used, as a report to the base station apparatus 3.

The base station apparatus 3 indicates the CRI or the time index of the SS/PBCH in indicating the beam to the terminal apparatus 1, and the terminal apparatus 1 receives based on the indicated CRI or the time index of the SS/PBCH. At this time, the terminal apparatus 1 may configure a spatial filter, based on the indicated CRI or the time index of the SS/PBCH for reception. The terminal apparatus 1 may receive by using the assumption of Quasi-Co-Location (QCL). One signal (antenna port, synchronization signal, reference signal, or the like) being in QCL or being assumed to be in QCL with another signal (antenna port, synchronization signal, reference signal, or the like) can be interpreted as one signal being associated with another signal.

In a case that a Long Term Property of a channel on which one symbol in one antenna port is carried may be estimated from a channel on which one symbol in the other antenna port is carried, the two antenna ports are said to be in QCL. The Long Term Property of the channel includes at least one of a delay spread, a Doppler spread, a Doppler shift, an average gain, or an average delay. For example, in a case that an antenna port 1 and an antenna port 2 are in QCL with respect to the average delay, this means that a reception timing for the antenna port 2 may be estimated from a reception timing for the antenna port 1.

The QCL may also be expanded to beam management. For this purpose, spatially expanded QCL may be newly defined. For example, the Long Term Property of a channel in spatial QCL assumption may be an Angle of Arrival ((AoA), a Zenith angle of Arrival (ZoA), or the like) and/or an Angle Spread (for example, Angle Spread of Arrival (ASA) or a Zenith angle Spread of Arrival (ZSA)), a transmission angle (AoD, ZoD, or the like) or an Angle Spread of the transmission angle (for example, an Angle Spread of Departure (ASD) or a Zenith angle Spread of Departure (ZSS)), Spatial Correlation, or a reception spatial parameter, in a radio link or channel.

For example, in a case that an antenna port 1 and an antenna port 2 are considered to be QCL, with respect to the reception spatial parameters, it means that the receive beam (reception spatial filter) for receiving a signal from the antenna port 2 can be inferred from the receive beam for receiving a signal from the antenna port 1.

Combinations of long terms properties which may be considered to be QCL may be defined as QCL types. For example, the following types may be defined.

Type A: Doppler shift, Doppler spread, average delay, delay spread
Type B: Doppler shift, Doppler spread Type C: Average delay, Doppler shift
Type D: Reception spatial parameters The above-described. QCL types may configure and/or indicate the QCL assumption of one or two reference signals and the PDCCH or the PDSCH DMRS in the RRC and/or MAC layer and/or DCI as a Transmission Configuration Indication (TCI). For example, in a case that index #2 of the PBCH/SS block and the QCL type A+the QCL type B are configured and/or indicated as one state of the TCI at a time when the terminal apparatus 1 receives the PDCCH, the terminal apparatus 1 may consider, at a time when receiving the PDCCH DMRS, the Doppler shift, the Doppler spread, the average delay, the delay spread, and the reception spatial parameters in the reception of the PBCH/SS block index #2 as the long term properties of the channel to receive the DMRS of the PDCCH to perform synchronization or channel estimation. At this time, the reference signal indicated by the TCI (the PBCH/SS block in the example described above) may be referred to as a source reference signal, and a reference signal affected by the long term properties inferred from the long term properties of the channel at a time when the source reference signal (the PDCCH DMRS in the example described above) is received may be referred to as a target reference signal. The TCI may be configured with multiple TCI states and a combination of a source reference signal and a QCL type for each state in the RRC, and indicated to the terminal apparatus 1 by the MAC layer or the DCI.

According to this method, operation of the base station apparatus 3 and the terminal apparatus 1 equivalent to beam management may be defined as beam management and beam indication/report, based on the spatial QCL assumption and radio resources (time and/or frequency).

The subframe will now be described. The subframe in the present embodiment may also be referred to as a resource unit, a radio frame, a time period, or a time interval.

Figure 2:
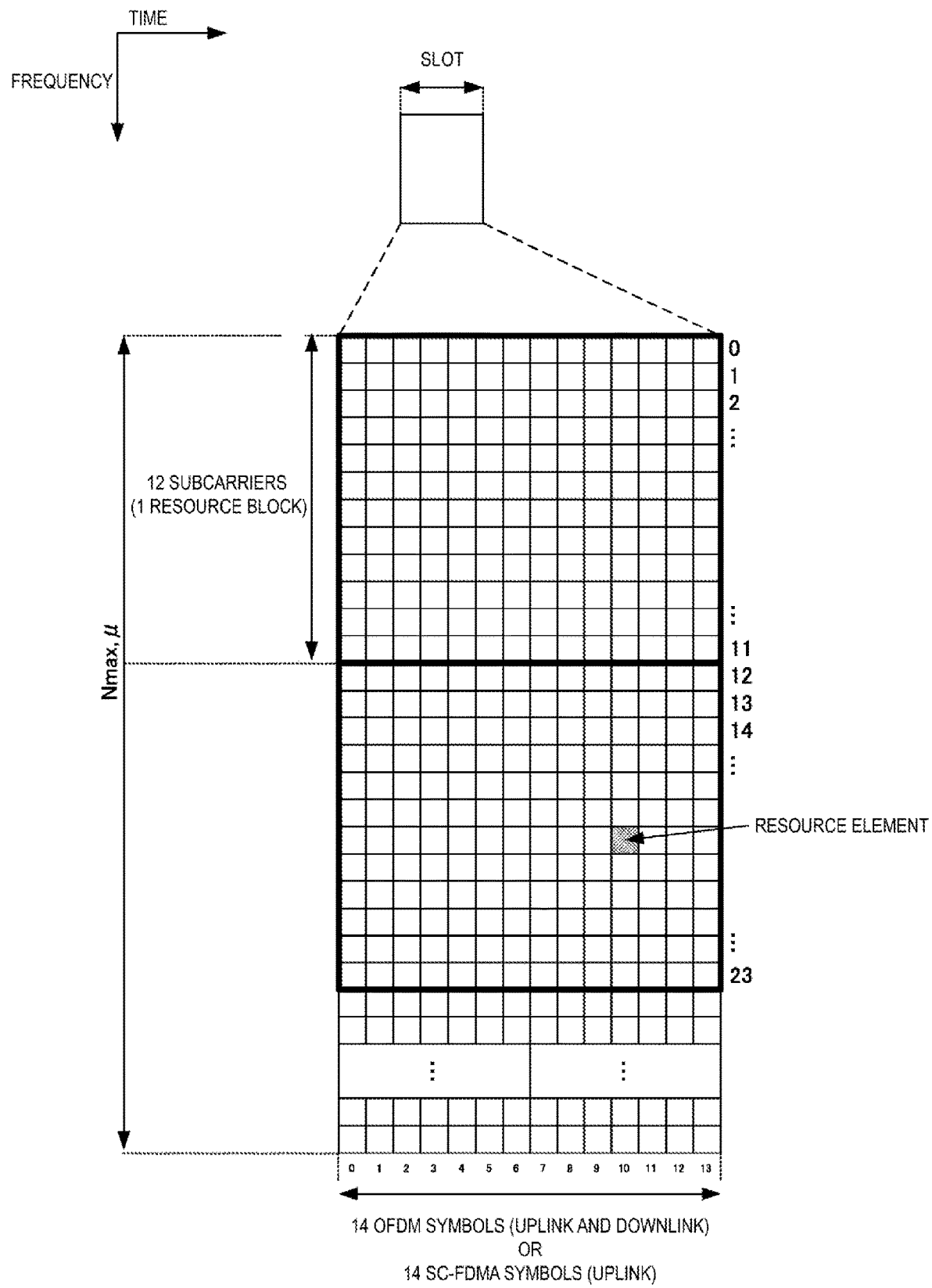
FIG. 2 is a diagram illustrating a schematic configuration of a downlink slot according to the present embodiment.

FIG. 2 is a diagram illustrating a schematic configuration of a downlink slot according to a first embodiment of the present invention. Each of the radio frames is 10 ms in length. Each of the radio frames includes 10 subframes and W slots. One slot includes X OFDM symbols. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 ad X=14 correspond to 0.5 ms and 1 ms, respectively. In a case that the subcarrier spacing is 60 kHz, X=7 or X=14, and X=7 and X=14 correspond to 0.125 ms and 0.25 ms, respectively. For example, in a case of X=14, W=10 is used in a case that the subcarrier spacing is 15 kHz, and W=40 is used in a case that the subcarrier spacing is 60 kHz. FIG. 2 illustrates a case of X=7 as an example. Note that a case of X=14 can be similarly configured by expanding the case of X=7. The uplink slot is defined similarly, and the downlink slot and the uplink slot may be defined separately. The bandwidth of the cell of FIG. 2 may also be defined as a BandWidth Part (BWP). The slot may also be defined as a Transmission Time Interval (TTI). A slot may not be defined as TTI. TTI may be a transmission period of a transport block.

The signal or the physical channel transmitted in each of the slots may be represented by a resource grid. The resource grid is defined by multiple subcarriers and multiple OFDM symbols. The number of subcarriers constituting one slot depends on each of the downlink and uplink bandwidths of a cell. Each element in the resource grid is referred to as a resource element. The resource element may be identified by using a subcarrier number and an OFDM symbol number.

A resource grid is used to represent mapping of a certain physical downlink channel (such as the PDSCH) or a certain physical uplink channel (such as the PUSCH) to resource elements. For example, in a case that the subcarrier spacing is 15 kHz, and in a case that the number X of OFDM symbols included in the subframe is 14 and NCPs are used, one physical resource block is defined by 14 continuous OFDM symbols in the time domain and by 12*Nmax continuous subcarriers in the frequency domain. Nmax is the maximum number of resource blocks determined by the subcarrier spacing configuration μ described below. In other words, the resource grid includes (14*12*Nmax, μ) resource elements. In a case of Extended CPs (ECPs), since it is supported only with the subcarrier spacing of 60 kHz, one physical resource block is defined by, for example, 12 (the number of OFDM symbols included in one slot)*4 (the number of slots included in one subframe)=48 continuous OFDM symbols in the time domain and by 12*Nmax, μ continuous subcarriers in the frequency domain. In other words, the resource grid includes (48*12*Nmax, μ) resource elements.

As a resource block, a reference resource block, a common resource block, a physical resource block, a virtual resource block is defined. One resource block is defined as 12 subcarriers that are continuous in the frequency domain. Reference resource blocks are common in all subcarriers, and, for example, may be configured with resource blocks at subcarrier spacing of 15 kHz, and may be numbered in ascending order. Subcarrier index 0 at reference resource block index 0 may be referred to as a reference point A (which may simply be referred to as a "reference point"). The common resource blocks are resource blocks numbered from 0 in ascending order in each subcarrier spacing configuration μ from the reference point A. The resource grid described above is defined by these common resource blocks. Physical resource blocks are resource blocks numbered in ascending order from 0 included in a bandwidth part (BWP) described below, and the physical resource blocks are resource blocks numbered in ascending order from 0 included in the bandwidth part (BWP). A certain physical uplink channel is first mapped to a virtual resource block. Thereafter, the virtual resource block is mapped to a physical resource block. (from TS38.211)

Next, the subcarrier spacing configuration μ will be described. As described above, multiple OFDM numerologies are supported in NR. In the BWP, the subcarrier spacing configuration μ (μ=0, 1, . . . , 5) and the cyclic prefix length are given by a higher layer for the downlink BAP, and are given by a higher layer in the uplink BWP. Here, in a case that μ is given, the subcarrier spacing Δf is given by Δf=2^μ*15 (kHz).

In the subcarrier spacing configuration μ, the slots are counted in ascending order from 0 to N^{subframe} . . . {slot}-1 in the subframe, and counted in ascending order from 0 to N^{frame, μ}_{slot}-1 in the frame. N^{slot}_{symb} continuous OFDM symbols are in the slot, based on the slot configuration and the cyclic prefix. N^{slot}_{symb} is 14. The start of the slot n^{μ}_{s} in the subframe is aligned with the start in time of the n^{μ}_{s} N^{slot}_{symb}-th OFDM symbol in the same subframe.

Figure 3:
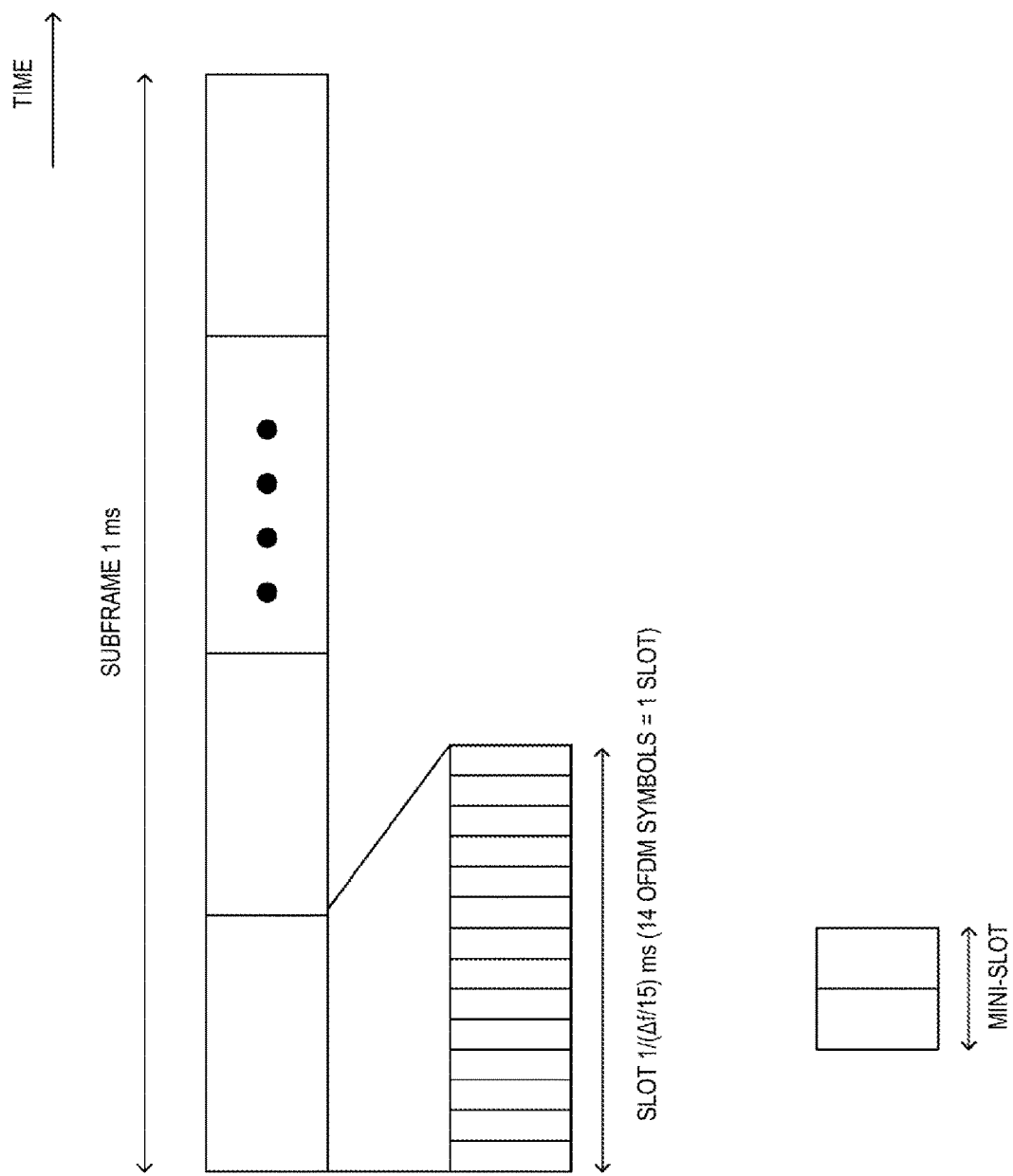
FIG. 3 is a diagram illustrating a relationship between a subframe and a slot and a mini-slot in a time domain.

The subframe, the slot, and a mini-slot will now be described. FIG. 3 is a diagram illustrating the relationship between the subframe and the slot and the mini-slot in the time domain. As illustrated in FIG. 3, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe. A downlink slot may be referred to as PDSCH mapping type A. An uplink slot may be referred to as PUSCH mapping type A.

The mini-slot (which may be referred to as a sub-slot) is a time unit including OFDM symbols that are less in number than the OFDM symbols included in the slot. FIG. 3 illustrates, by way of example, a case that the mini-slot includes 2 OFDM symbols. The OFDM symbols in the mini-slot may match the timing for the OFDM symbols constituting the slot. Note that the smallest unit of scheduling may be a slot or a mini-slot. Allocating a mini-slot may be referred to as non-slot based scheduling. Scheduling the mini-slots may be expressed as scheduling resources in which the relative time positions of the starting positions of the reference signal and the data are fixed. A downlink mini-slot may be referred to as PDSCH mapping type B. An uplink mini-slot may be referred to as PUSCH mapping type B.

Figure 4:
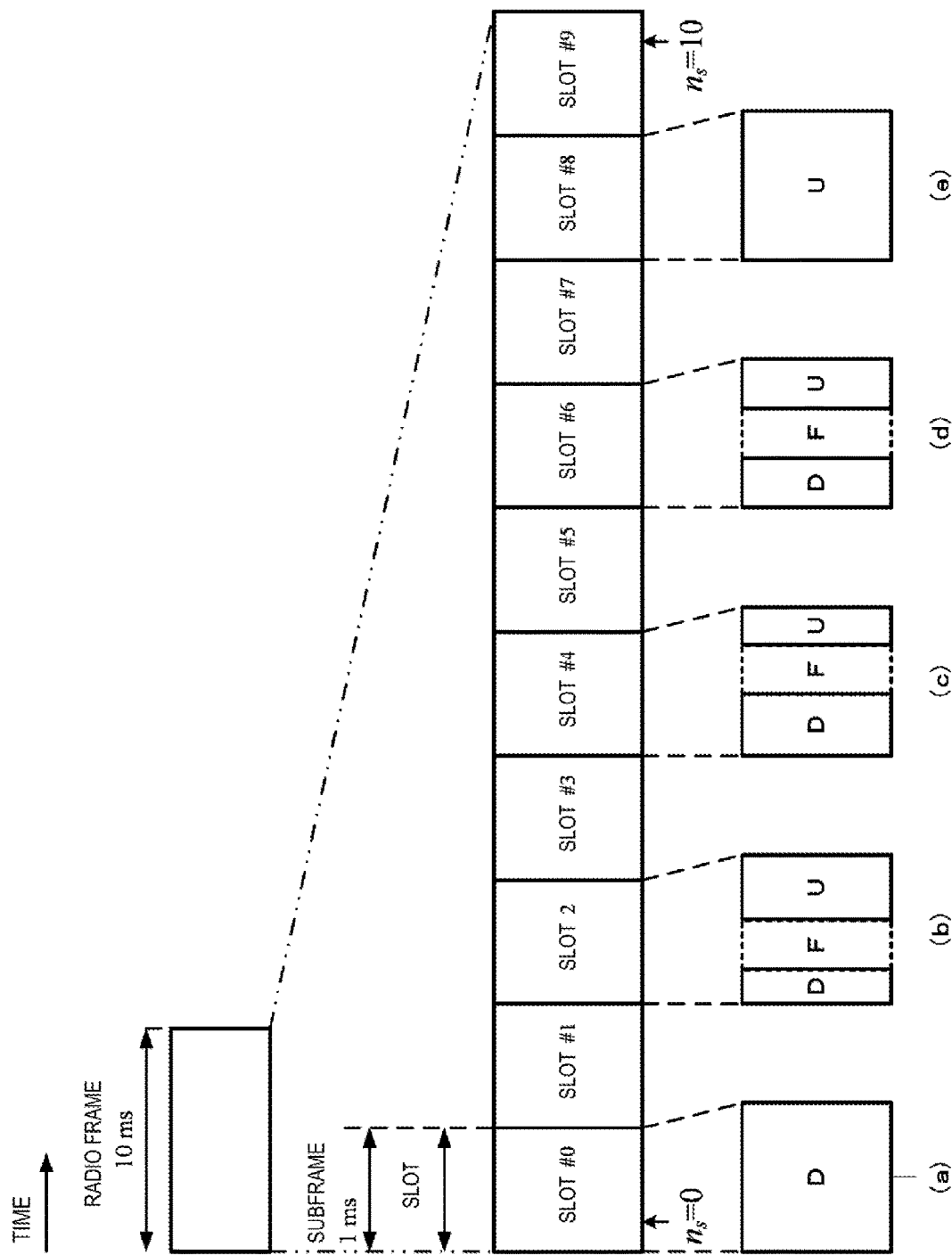
FIG. 4 is a diagram illustrating examples of a slot or a subframe.

FIG. 4 is a diagram illustrating an example of a slot format. Here, a case that the slot length is 1 ms at a subcarrier spacing of 15 kHz is illustrated as an example. In FIG. 4, D represents the downlink, and U represents the uplink. As illustrated in FIG. 4, during a certain time interval (for example, the minimum time interval to be allocated to one UE in the system), the subframe may include at least one of the followings:

downlink symbol,
flexible symbol, or
uplink symbol.

Note that these ratios may be predetermined as slot formats. These ratios may also be defined by the number of downlink OFDM symbols included in the slot or the start position and the end position within the slot. These ratios may also be defined by the number of uplink OFDM symbols or DFT-S-OFDM symbols included in the slot or the start position and the end position within the slot. Note that scheduling the slots may be expressed as scheduling resources in which the relative time positions of the reference signal and the slot boundary are fixed.

The terminal apparatus 1 may receive a downlink signal or a downlink channel in a downlink symbol or a flexible symbol. The terminal apparatus 1 may transmit an uplink signal or a downlink channel in an uplink symbol or a flexible symbol.

FIG. 4(a) is an example in which the entire subframe is used for downlink transmission during a certain time interval (which may be referred to as, for example, a minimum unit of a time resource that can be allocated to one UE, or a time unit, or multiple minimum units of time resources may be collectively referred to as a time unit). In FIG. 4(b), an uplink is scheduled via the PDCCH for example by using the first time resource, and an uplink signal is transmitted after a gap for a processing delay of the PDCCH, a time for switching from the downlink to the uplink, and a flexible symbol including generation of a transmit signal. In FIG. 4(c), the PDCCH and/or downlink PDSCH are transmitted by using the first time resource, and the PUSCH or PUCCH are transmitted after a gap for a processing delay, a time for switching from the downlink to the uplink, and generation of a transmit signal. Here, for example, the uplink signal may be used to transmit the HARQ-ACK and/or CSI, namely, the UCI. In FIG. 4(d), the PDCCH and/or PDSCH are transmitted by using the first time resource, and the uplink PUSCH and/or PUCCH are transmitted after a gap for a processing delay, a time for switching from the downlink to the uplink, and generation of a transmit signal. Here, for example, the uplink signal may be used to transmit the uplink data, namely, the UL-SCH. FIG. 4(e) is an example in which the entire subframe is used for uplink transmission (PUSCH or PUCCH).

The above-described downlink part and uplink part ay include multiple OFDM symbols as is the case with LTE.

Figure 5:
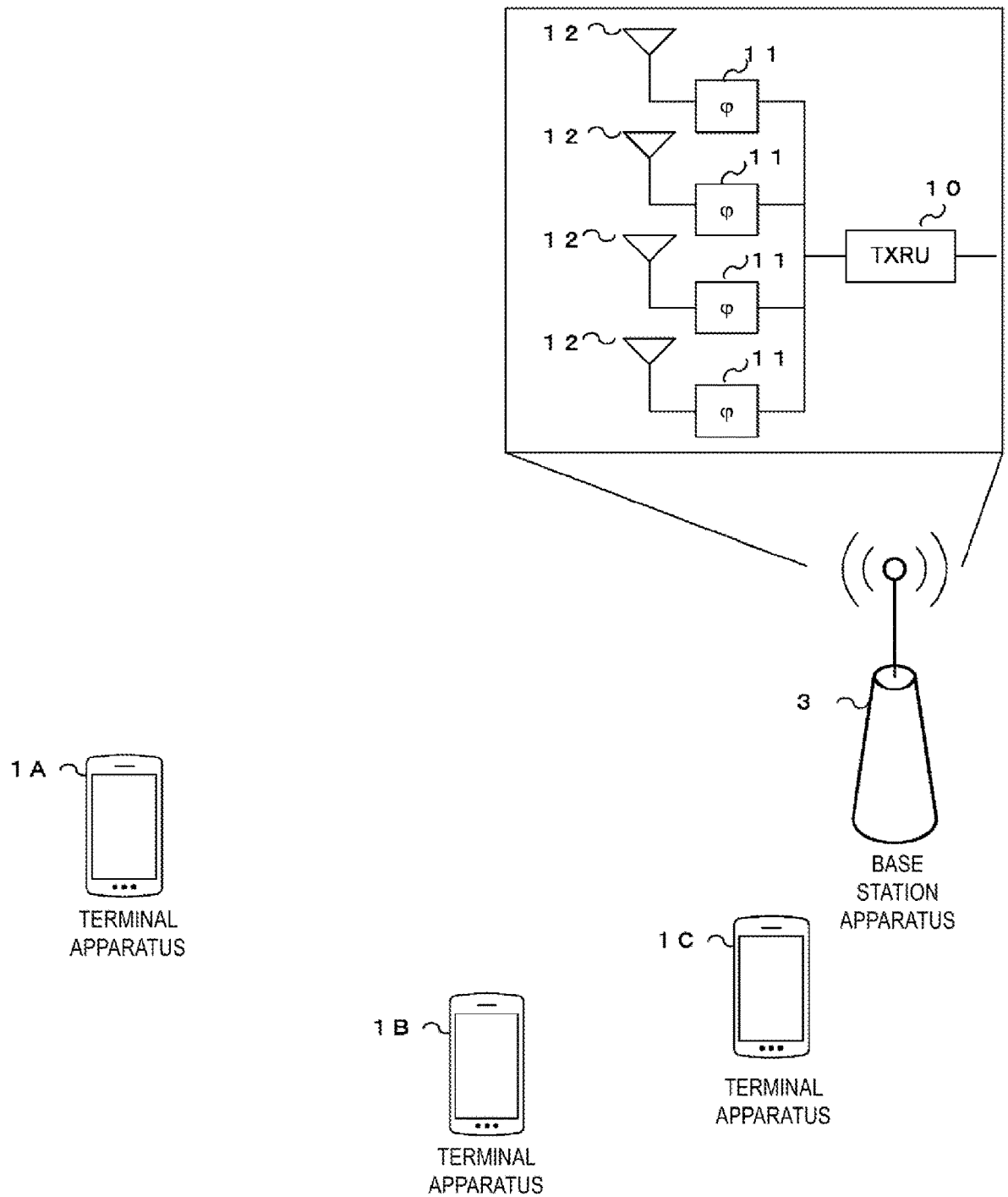
FIG. 5 is a diagram illustrating an example of beamforming.

FIG. 5 is a diagram illustrating an example of beamforming. Multiple antenna elements are connected to one Transceiver unit (TXRU) 10. The phase is controlled by using a phase shifter 11 for each antenna element and a transmission is performed from an antenna element 12, thus allowing a beam for a transmit signal to be directed in any direction. Typically, the TXRU may be defined as an antenna port, and only the antenna port may be defined for the terminal apparatus 1. Controlling the phase shifter 11 allows setting of directivity in any direction. Thus, the base station apparatus 3 can communicate with the terminal apparatus 1 by using a high gain beam.

Hereinafter, the bandwidth part (BWP) will be described. The BWP is also referred to as a carrier BWP. The BWP may be configured for each of the downlink and the uplink. The BWP is defined as a set of continuous physical resources selected from continuous subsets of common resource blocks. The terminal apparatus 1 may be configured with up to four BWPs in which one downlink carrier BWP is activated at a certain time. The terminal apparatus 1 may be configured with up to four BWPs in which one uplink carrier BWP is activated at a certain time. In the case of carrier aggregation, the BWP may be configured for each serving cell. At this time, configuring one BWP in a certain serving cell may be expressed as configuring no BWP. Configuring two or more BWPs may be expressed as configuring BWP.

In an activated serving cell, there is always one active (activated) BWP. BWP switching for a certain serving cell is used to activate art inactive (deactivated) BWP and deactivate an active (activated) BWP. BWP switching for a certain serving cell is controlled by the PDCCH indicating a downlink assignment or an uplink grant, in addition of the SpCell (PCell or PSCell) or the activation of the SCell, one BWP is initially active without receiving the PDCCH indicating a downlink assignment or an uplink grant. The initially active BWP may be specified by an RRC message transmitted from the base station apparatus 3 to the terminal apparatus 1. The active BWP for a certain serving cell is specified by the RRC or the PDCCH transmitted from the base station apparatus 3 to the terminal apparatus 1. In Unpaired spectrum (such as TDD bands), the DL BWP and the UL BWP are paired, and BWP switching is common to the UL and the DL. In the active BWP for each of the activated serving cells for which the BWP is configured, the MAC entity of the terminal apparatus 1 applies normal processing. The normal processing includes transmitting the UL-SCH, transmitting the RACH, monitoring the PDCCH, transmitting the PUCCH, and receiving the DL-SCH. In an inactive BWP for each of the activated serving cells for which the BWP is configured, the MAC entity of the terminal apparatus 1 does not transmit the UL-SCH, does not transmit the RACH, does not monitor the PDCCH, does not transmit the PUCCH, and does not receive the DL-SCH. In a case that a certain serving cell is deactivated, an active BWP may not be present (for example, the active BWP is deactivated).

The terminal apparatus 1 may be configured with one primary cell and up to 15 secondary cells.

The time and frequency resources for reporting the CSI used by the terminal apparatus 1 are controlled by the base station apparatus 3. The CSI includes a Channel Quality Indicator (CQI), a Precoding Matrix Indicator (PMI), a CSI-RS Resource Indicator (CRI), a Strongest Layer Indication (SLI), a rank indication (RI), and/or a Layer-1 Reference Signal Received Power (L1-RSRP). For the CQI, PMI, CRI, SLI, RI, and L1-RSRP, the terminal apparatus 1 is configured by a higher layer with a configuration related to N (N is equal to or greater than 1) CSI reports, a configuration related to resources of M (M is equal to or greater than 1) CSI reference signals (CSI RSs), and a configuration related to one CSI measurement including L (L is equal to or greater than 1) links. The configuration related to the CSI measurement includes a list of configurations related to the CSI reports, a list of configurations related to the CSI resources, a list of configurations of the links, and a list of trigger states. Each will be described below.

Each of the configurations related to the CSI reports is associated with one downlink BWP (the BWP identity of a higher layer), and each of the configurations related to the CSI reports includes the following parameters to be reported.

One identity for identifying a configuration related to the CSI report

Operation in the time domain (for example, periodic, semi-persistent, or Aperiodic)

CSI parameters to be reported (for example, CRI, RI, PMI, CQI, or the like)

Configuration in the frequency domain (including each of the information to configure the broadband CQI or the subband CQI, and information to configure the wideband PMI or the subband PMI)

Configuration of restriction on CSI measurement (measurement restriction configuration, which may be configured for each of the channel measurement and interference measurement)

Codebook configuration (information of the CSI type (information for indicating type 1 or type 2) and codebook subset restriction)

Maximum number of CQI per report (which may be information for indicating either one codeword or two codewords)

Assumption of the CQI table table including up to 64 QAM, CQI table including up to 256 QAM, URLLC, or the like)

Each of the configurations related to the CSI resources includes information related to S (S is equal to or greater than 1) CSI-RS resource sets, and each CSI-RS resource set includes multiple CSI-RS resources (a NZPCSI-RS for channel measurement or interference measurement, and a CSI-Interference Measurement (IM) resource for interference measurement), and a configuration related to resources of the SS/PBCH block used for L1-RSRP calculation. Here, the NZP CSI-RS resource is a CSI-RS in which the sequence is generated in accordance with a generation method defined in advance in the specification, and the CSI-RS is mapped to resource elements. Each of the configurations related to the CSI resources is placed in an identified BWP in a higher layer, and the configurations related to all the CSI resources linked to a configuration related to one CSI report is the same BWP.

Next, the channel measurement and interference measurement described above will be described. The channel measurement is to measure the amount related to the quality of each layer or each codeword in a case that the downlink desired signal or channel or spatial multiplexing is assumed for the CSI measurement, and the interference measurement is to measure the amount of interference in each layer or codeword in a case that the downlink interference signal or channel or spatial multiplexing is assumed for the CSI measurement. Here, "layer" refers to the number of PDSCHs to be spatially multiplexed.

Note that the configuration (ssb-Resources) related to the resources of the SS/PBCH block used for the L1-RSRP calculation may be included in each of the configurations related to the CSI resources.

The operation in the time domain of the CSI-RS resources may be included in each of the configurations related to the CSI resources. The operation in the time domain of the CSI-RS resources may be included in each of the configurations related to CSI-RS resource sets.

The configuration of each link includes an indication of the configuration related to the CSI report, an indication of the CSI configuration, and an indication of whether to measure the channel measurement or the interference measurement. The configuration of each link may include multiple trigger states for dynamically selecting a configuration related to the CSI report for one or multiple aperiodic CSI reports.

Each trigger state is associated with a configuration related to one or multiple CSI reports, and the configuration related to each CSI report is linked to a configuration related to one or multiple periodic, semi-persistent, or aperiodic CSI reference signals. Here, the terminal apparatus may assume the following, depending on the number of configurations associated with the linked CSI resources.

In a case that one configuration related to CSI resources is configured, the resource configuration is for channel measurement for L1-RSRP calculation.

In a case that two configurations related to CSI resources are configured, the first configuration related to CSI resources is for channel measurement, and the second configuration related to CSI resources is for interference measurement on the CSI-IM or the NZP CSI-RS resource.

In a case that three configurations related to CSI resources are configured, the first configuration related to CSI resources is for channel measurement, the second configuration related to CSI resources is for interference measurement on the CSI-IM resource, and the third configuration related to CSI resources is for interference measurement on the NZP CSI-RS resource.

For the CSI measurement, the terminal apparatus 1 may assume the following.

Each NZP CSI-RS port configured for the interference measurement corresponds to transmission layers of interference;

All transmission layers of interference on the NZP CSI-RS port is considered for the associated Energy per resource element (EPRE); and There are other interference signals on the NZP CSI-RS resource for the channel measurement, the CSI-RS resource for the interference measurement, or the CSI-IM resource for interference measurement Here, EPRE represents the energy of the NZP CSI-RS per resource element. Specifically, the base station apparatus 3 is configured with each of the ratio (Pc) of the PDSCH EPRE to the EPRE of the NZP CSI-RS, the ratio (Pc-PDCCH) of the PDCCH EPRE to the EPRE of the NZP CSI-RS, and the ratio (Pc_SS) of the EPRE of the SS/PBCH block to the EPRE of the NZP CSI-RS. In this way, the EPRE can be considered for the CSI measurement from the ratio of the energy in which the CSI-RS EPRE is configured.

A configuration related to one or multiple CSI reports for the channel measurement and/or the interference measurement on one or multiple component carriers and/or trigger states for one or multiple CSI-RS resource sets are configured by a higher layer for a CSI-RS resource set in which the operation in the time domain of the CSI-RS resource set is aperiodic. For a trigger of an aperiodic CSI report, one set of CSI trigger states is configured with higher layer parameters, and the CSI trigger states are associated with any one candidate of DL MVP. The terminal apparatus 1 does not expect that the CSI report for the downlink BWP not activated is triggered. Each trigger state is initiated by using a CSI request field included in the DCI (for example, DCI format 0_1).

In this case, the terminal apparatus performs the following operations.

- In a case that the value of the CSI request field is 0, CSI is not requested
- In a case that the number of CSI trigger states is greater than $2^{N_{TS}}-1$, the terminal apparatus 1 receives, from the MAC layer, a selection command to be used for mapping to the $2^{N_{TS}}-1$ trigger states to the code point of the CSI request field. Here, $N_{TS}$ is the bit size of the CSI request field configured in a higher layer. $N_{TS}$ may be configured with any value from {0, 1, 2, 3, 5, 6}.
- In a case that the number of CSI trigger states is smaller than or equal to $2^{N_{TS}}-1$, the CSI request field directly indicates the trigger state and the QCL assumption of the terminal apparatus 1.
- For the aperiodic CSI-RS resource associated with each CSI trigger state, the terminal apparatus 1 is indicated a source reference signal of QCL and the QCL configuration of the QCL type from the higher layer (for example, the TCI may be used).

Here, $N_{TS}$ is the number of bits of the CSI request field of the DCI, and the number of states of the triggers ($N_{CSI}$) for the aperiodic CSI report configured by the RRC may be greater than or smaller than or equal to $2^{N_{TS}}-1$.

In a case that a configuration related to a CSI resource linked to a configuration related to one CSI report has a configuration related to multiple aperiodic CSI-RS resource sets, and a portion of the aperiodic CSI-RS resource sets is associated with a trigger state, a bitmap is configured by a higher layer for selecting a CSI-IM resource or a NZP CSI-RS resource set per trigger state for each CSI-RS resource set.

The configuration described above will be described, Information related to the CSI measurement may be included in information (for example, ServingCellConfigDedicated) configured for the terminal apparatus 1 for each cell. In other words, the information related to the CSI measurement is configured for each cell, and the information related to the CSI measurement of each cell includes the following information.

- List of configurations related to N CSI reports
- List of configurations related to M CSI reference signals
- List of links between configurations related to L CSI reports and configurations for related to CSI reference signals (csi-MeasIdToAddModList)
- Information related to triggers of CSI reports (the number of bits $N_{TS}$ of the CSI request field and/or the trigger state corresponding to the value of the CSI request field)

The configuration related to each CSI report includes the index or the identity of the configuration related to the CSI report, information for configuring the operation in the time domain, and information for configuring which CSI to report. The configuration related to each CSI report may also include a BWP index for identifying one BWP.

In a case that the information for configuring the operation in the time domain indicates periodic or semi-persistent, a period (number of slots) for reporting CSI may be included. In a case that the information for configuring the operation in the time domain indicates Aperiodic, the information related to the offset of the number of slots from the slot where the aperiodic CSI report is triggered to transmitting the CSI report. In a case that the information for configuring the operation in the time domain indicates Aperiodic, the configuration related to each CSI report may include the index of the trigger state of the CSI report.

The configuration related to each link may include the index or the identity of the configuration related to the CSI report to be linked, the index or the identity of the configuration related to the CSI reference signal, and the identity of the link.

FIG. 6 illustrates an example of an RRC configuration related to the CSI measurement and a CSI request field in a certain serving cell c. Here, the description is made as the number of trigger states configured by the RRC $N_{CSI}=3$, the number of bits of the CSI request field $N_{TS}=2$. Note that here, it is assumed that the number of BWPs configured for the serving cell is 2. As illustrated in FIG. 6, a list of configurations for CSI reports is configured for the information related to the CSI measurement of the serving cell c, and four configurations related to the CSI reports are configured in the list. Among them, the configurations of aperiodic CSI reports are configurations #1 to #3 related to the CSI report.

The configuration #1 related to the CSI report is associated with the trigger state #0, the configuration #2 related to the CSI report is associated with the trigger state #1, and the configuration #3 related to the CSI report is associated with the trigger state #2. In this case, because of $N_{CSI}=2^{N_{TS}}-1$, it is mapped directly to the 2-bit CSI request field included in the DCI format. As illustrated in FIG. 6, "00" of the CSI request field does not transmit the CSI report. The trigger state #0 is associated with "01", the trigger state #1 is associated with "10", and the trigger state #2 is associated with "11".

The terminal apparatus 1 reports the CSI in the PUSCH, based on the configuration related to the CSI report configured by the RRC and the configuration related to the CSI report associated with the value of the CSI request field included in the DCI. At this time, the terminal apparatus 1 measures the CSI, based on the CSI parameters to be reported included in the configuration related to the CSI report, from the CSI-RS resource set or the CSI-RS resource for measuring the CSI from the configuration related to the CSI resource associated with the configuration related to the CSI report.

The configuration related to each CSI report is associated with the BWP in the serving cell. In FIG. 6, the trigger state #1 and the trigger state #2 are associated with the BWP index #0 and the BWP index #1, respectively. In other words, in a case that 10 is indicated as the value of the CSI request field, the terminal apparatus 1 reports the CSI in the BWP #1. In other words, the value (information) of the CSI request field indicates one of multiple trigger states, each of the multiple trigger states is configured for each serving cell, and is associated with a configuration related to one or multiple CSI reports and a configuration related to one or multiple reference signals for the CSI measurement. Note that the value of the CSI request field may be stated as information included in the CSI request field.

Here, "active" is configured as the BWP index of the trigger state #0 rather than the actual index of the configured BWP. This means being associated with the activated BWP. For example, in a case that the BWP indicating khe BWP index #0 is activated in a certain slot for the terminal apparatus 1, the CSI request field "01" measures the CSI in the BWP corresponding to the activated BWP index #0, and reports the CSI. On the other hand, in a case that the BWP corresponding to the BWP index #1 is activated in a certain slot, the CSI request field "01" measures the CSI in the BWP corresponding to the activated BWP index #1, and reports the CSI. In other words, the CSI request field included in the DCI of the PDCCH includes a trigger state, each trigger state is associated with a configuration related to one or multiple CSI reports and a configuration related to one or multiple CSI resources, and one of the multiple trigger skates is configured to be associated with the activated BWP of the serving cell c.

FIG. 7 illustrates an example of a configuration and a CSI request field in a case of the number of trigger states configured by the RRC $N_{CSI}$=4, and the number of bits of the CSI request field $N_{TS}$=2 in a certain serving cell. In the example of FIG. 7, as in FIG. 6, each of the configurations related to the CSI report in which the time operation is aperiodic is associated with a BWP index and a trigger state.

In the example of FIG. 7, because of $N_{CSI}>2^{NTS}-1$, the trigger states for each code point "01", "10", and "11" in the CSI request field is selected via the MAC layer. As illustrated in FIG. 7, one or multiple trigger states may be selected for the four trigger states configured by the RRC by using a bitmap for indicating each trigger state for each code point. In the example of FIG. 7, a 4-bit bitmap "1000" for selection of each trigger state for the code point "01" is indicated to the terminal apparatus 1 and mapped to correspond to the CSI request field "01". This means that the trigger state #0 is configured to the code point "01" of the CSI request field. In this manner, each code point is selected by a bitmap corresponding to each trigger state in the MAC layer. In other words, the CSI request field included in the DCI of the PDCCH includes a trigger state, and each trigger state is associated with a configuration related to one or multiple CSI reports and a configuration related to one or multiple CSI resources, One or multiple trigger states associated with the CSI request field are selected from the multiple trigger states by using a bitmap in the MAC layer, and are mapped to each of the code points in the CSI request field.

FIG. 8 illustrates an example in a case that two serving cells are configured. Here, an example is illustrated in which two serving cells are configured as the number of serving cells, and trigger states are allocated to the configurations related to the aperiodic CSI report in each cell. As illustrated in the drawing, multiple configurations related to CSI reports are associated in the CSI request field. For example, the trigger state #1 of the serving cell #1 and the trigger state #1 of the serving cell #2 are configured to the code point "01".

Here, in a case that "10" is indicated as the value of the CSI request field for the terminal apparatus 1 in a certain slot, the terminal apparatus 1 reports the CSI of the BWP #0 of the serving cell #1 and the CSI of the BWP #0 of the serving cell #2. In this case, in a case that the BWP #0 of the serving cell #1 and the BWP #0 of the serving cell #2 are activated together, the terminal apparatus 1 reports the CSI of the BWP #0 of the serving cell #1 and the BWP #0 of the serving cell #2.

In a case that the BWP #0 of the serving cell #1 is activated but the BWP #0 of the serving cell #2 is not activated, the terminal apparatus 1 reports the CSI of the BWP #0 of the serving cell #1. In this way, multiple serving cells are configured, and the CSI report of each serving cell indicated by the value of the CSI request field is made. In other words, the terminal apparatus 1 receives the PDCCH for carrying the DCI including the CSI request field, and in a case that the CSI report of the BWP in the multiple serving cells is triggered based on the CSI request field, the terminal apparatus 1 transmits the CSI report of only the BWP indicated by the activated BWP index. At this time, the CSI request field indicates a trigger state, and the trigger state indicates one of multiple states. Each state of the multiple states is configured for each serving cell, and is associated with a configuration related to one or multiple CSI reports and a configuration related to one or multiple CSI resources and a BWP index for each serving cell.

Here, in the example described above, a configuration related to one CSI report is configured for one value of the CSI request field, but multiple CSI reports may be associated.

In the example described above, a case is illustrated that the configuration related to the CSI report of each serving cell is always associated with the configuration related to the BWP index, but in a case that there is one BWP, the associated information may not be configured. In this case, the CSI measurement and the CSI reporting may be performed based on the bandwidth of the serving cell.

Although an example is described above in which the CSI report is transmitted based on whether or not the BWP is activated, even in a case that the serving cell is deactivated, the CSI report in the serving cell may not be transmitted, and the CSI of only the activated serving cell and/or activated BWP may be reported.

Although, in the example described above, the information for indicating the index of the trigger state is included in the configuration related to the CSI report, the configuration related to the CSI measurement may include the list of trigger states, and which configuration related to the CSI report is included in each trigger state may be configured.

In other words, in the present invention, the terminal apparatus 1 may report only the CSI of the activated serving cell. The terminal apparatus 1 may report only the CSI of the activated BWP in a case of a cell in which the BWP is configured and activated. The terminal apparatus 1 may not report the CSI of the deactivated serving cell. The CSI of the deactivated BWP may not be reported. The BWP index included in the configuration related to the CSI report may be configured for each serving cell, and the serving cell index and the BWP index may be used for identification of the BWP.

An aspect of the present embodiment may be operated in carrier aggregation or dual connectivity with the Radio Access Technologies (RAT) such as LTE and LTE-A/LTE-A Pro. In this case, the aspect may be used for some or all of the cells or cell groups, or the carriers or carrier groups (for example, Primary Cells (PCells), Secondary Cells (SCells), Primary Secondary Cells (PSCells), Master Cell Groups (MCGs), or Secondary Cell Groups (SCGs)). The aspect may be independently operated and used in a stand-alone manner. In the dual connectivity operation, the Special Cell (SpCell)) is referred to as a PCell of the MCG or a PSCell of the SCG, respectively, depending on whether the MAC entity is associated with the MCG or is associated with the SCG. Except the dual connectivity operation, the Special Cell (SpCell) is referred to as a PCell. The Special Cell (SpCell) supports PUCCH transmission and contention based random access.

Figure 9:
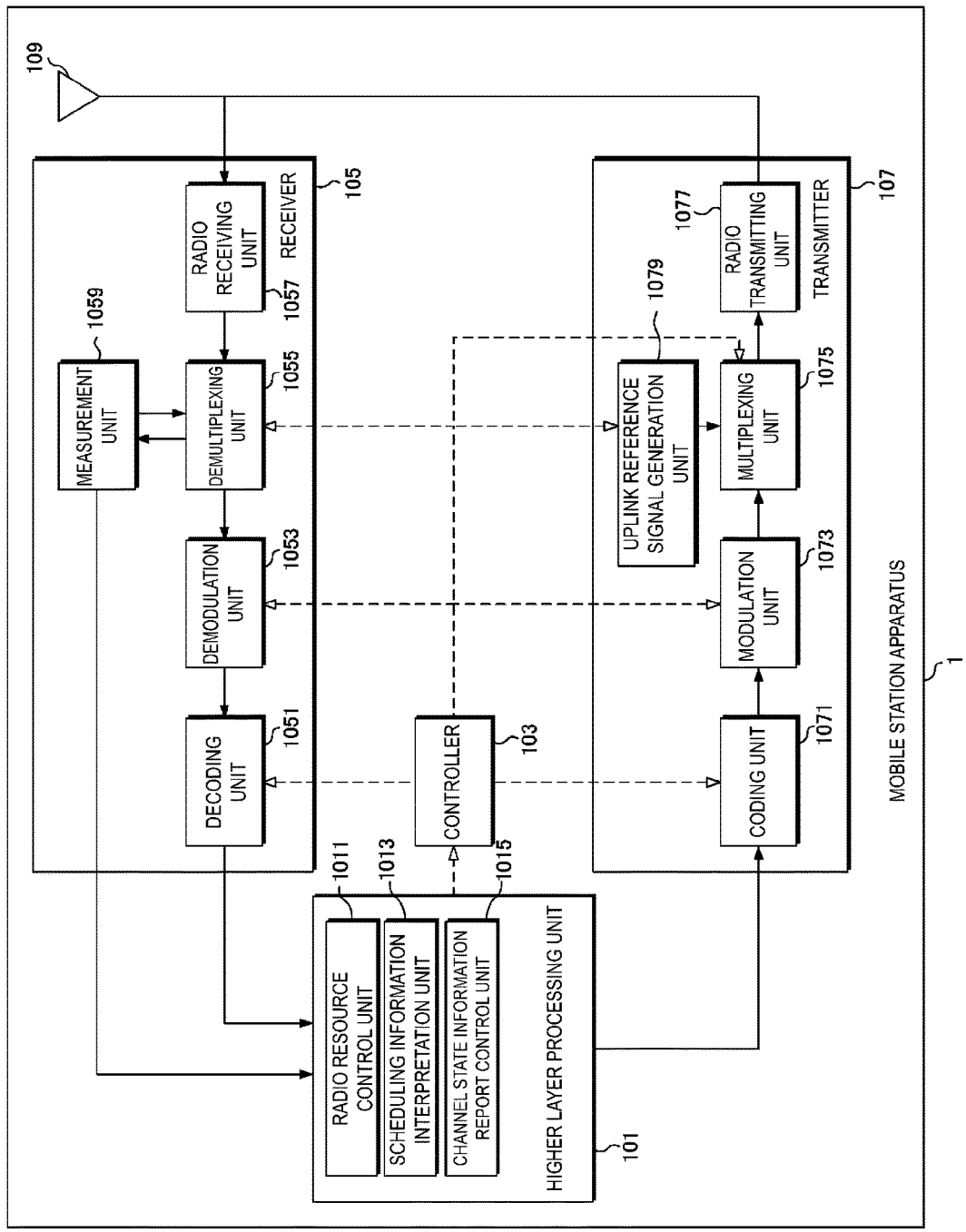
FIG. 9 is a schematic block diagram illustrating a configuration of the terminal apparatus 1 according to the present embodiment.

Configurations of apparatuses according to the present embodiment will be described below. Here, an example of a case is illustrated in which CP-OFDM is applied as a downlink radio transmission scheme, and CP-OFDM or DFTS-OFDM (SC-FDM) is applied as an uplink radio transmission scheme, FIG. 9 is a schematic block diagram illustrating a configuration of the terminal apparatus 1 according to the present embodiment. As illustrated in FIG. 9, the terminal apparatus 1 is configured to include a higher layer processing unit 101, a controller 103, a receiver 105, a transmitter 107, and a transmit and/or receive antenna 109. The higher layer processing unit 101 includes a radio resource control unit 1011, a scheduling information interpretation unit 1013, and a Channel State Information (CSI) report control unit 1015. The receiver 105 includes a decoding unit 1051, a demodulation unit 1053, a demultiplexing unit 1055, a radio receiving unit 1057, and a measurement unit 1059. The transmitter 107 includes a coding unit 1071, a modulation unit 1073, a multiplexing unit 1075, a radio transmitting unit 1077, and an uplink reference signal generation unit 1079.

The higher layer processing unit 101 outputs the uplink data (the transport block) generated by a user operation or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various pieces of configuration information of the terminal apparatus 1. The radio resource control unit 1011 generates information allocated in each channel for uplink, and outputs the generated information to the transmitter 107.

The scheduling information interpretation unit 1013 included in the higher layer processing unit 101 interprets the DCI (scheduling information) received through the receiver 105, generates control information for control of the receiver 105 and the transmitter 107, in accordance with a result of interpreting the DCI, and outputs the generated control information to the controller 103.

The CSI report control unit 1015 indicates to the measurement unit 1059 to derive Channel State Information (RI/PMI/CQI/CRI) relating to the CSI reference resource. The CSI report control unit 1015 indicates to the transmitter 107 to transmit RI/PMI/CQI/CRI. The CSI report control unit 1015 sets a configuration that is used in a case that the measurement unit 1059 calculates CQI.

In accordance with the control information from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and/or receive antenna 109, and outputs information resulting from the decoding to the higher layer processing unit 101.

The radio receiving unit 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1057 removes a portion corresponding to a Guard. Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into the downlink PDCCH, the downlink PDSCH, and the downlink reference signal. The demultiplexing unit 1055 performs channel compensation for the PDCCH and PUSCH, based on the channel estimate value input from the measurement unit 1059. The demultiplexing unit 1055 outputs the downlink reference signal resulting from the demultiplexing, to the measurement unit 1059.

The demodulation unit 1053 demodulates the downlink PDCCH and outputs a signal resulting from the demodulation to the decoding unit 1051. The decoding unit 1051 attempts to decode the PDCCH, In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), 64 QAM, or 256 QAM and outputs a signal resulting from the demodulation to the decoding unit 1051. The decoding unit 1051 performs decoding in accordance with information of a transmission or an original coding rate notified with the downlink control information, and outputs, to the higher layer processing unit 101, the downlink data (the transport block) resulting from the decoding.

The measurement unit 1059 performs downlink path loss measurement, channel measurement, and/or interference measurement from the downlink reference signal input from the demultiplexing unit 1055, The measurement unit 1059 outputs, to the higher layer processing unit 101, the measurement result and CSI calculated based on the measurement result. The measurement unit 1059 calculates a downlink channel estimate value from the downlink reference signal and outputs the calculated downlink channel estimate value to the demultiplexing unit 1055.

The transmitter 107 generates the uplink reference signal in accordance with the control signal input from the controller 103, codes and modulates the uplink data (the transport block) input from the higher layer processing unit 101, multiplexes the PUCCH, the PUSCH, and the generated uplink reference signal, and transmits a signal resulting from the multiplexing to the base station apparatus 3 through the transmit and/or receive antenna 109.

The coding unit 1071 codes the Uplink Control Information and the uplink data input from the higher layer processing unit 101. The modulation unit 1073 modulates the coded bits input from the coding unit 1071, in compliance with a modulation scheme such as BPSK, QPSK, 16 QAM, 64 QAM, or 256 QAM.

The uplink reference signal generation unit 1079 generates a sequence determined according to a prescribed rule (formula), based on a physical cell identity (also referred to as a Physical Cell Identity (PCI), a cell ID, or the like) for identifying the base station apparatus 3, a bandwidth in which the uplink reference signal is mapped, a cyclic shift notified with the uplink grant, a parameter value for generation of a DMRS sequence, and the like.

Based on the information used for the scheduling of PUSCH, the multiplexing unit 1075 determines the number of PUSCH layers to be spatially multiplexed, maps multiple pieces of uplink data to be transmitted on the same PUSCH to multiple layers through Multiple Input Multiple Output Spatial Multiplexing (MIMO SM), and performs precoding on the layers.

In accordance with the control signal input from the controller 103, the multiplexing unit 1075 performs Discrete Fourier Transform (DFT) on modulation symbols of PUSCH. The multiplexing unit 1075 multiplexes PUCCH and/or PUSCH signals and the generated uplink reference signal for each transmit antenna port. To be more specific, the multiplexing unit 1075 maps the PUCCH and/or PUSCH signals and the generated uplink reference signal to the resource elements for each transmit antenna port.

The radio transmitting unit 1077 performs Inverse Fast Fourier Transform (IFFT) on a signal resulting from the multiplexing to perform modulation in compliance with an SC-FDMA A scheme, adds the Guard Interval to the SC-FDM-modulated SC-FDM symbol to generate a baseband digital signal, converts the baseband digital signal into an analog signal, generates an in-phase component and an orthogonal component of an intermediate frequency from the analog signal, removes frequency components unnecessary for the intermediate frequency band, converts (up converts) the signal of the intermediate frequency into a signal of a high frequency, removes unnecessary frequency components, performs power amplification, and outputs a final result to the transmit and/or receive antenna 109 for transmission.

Figure 10:
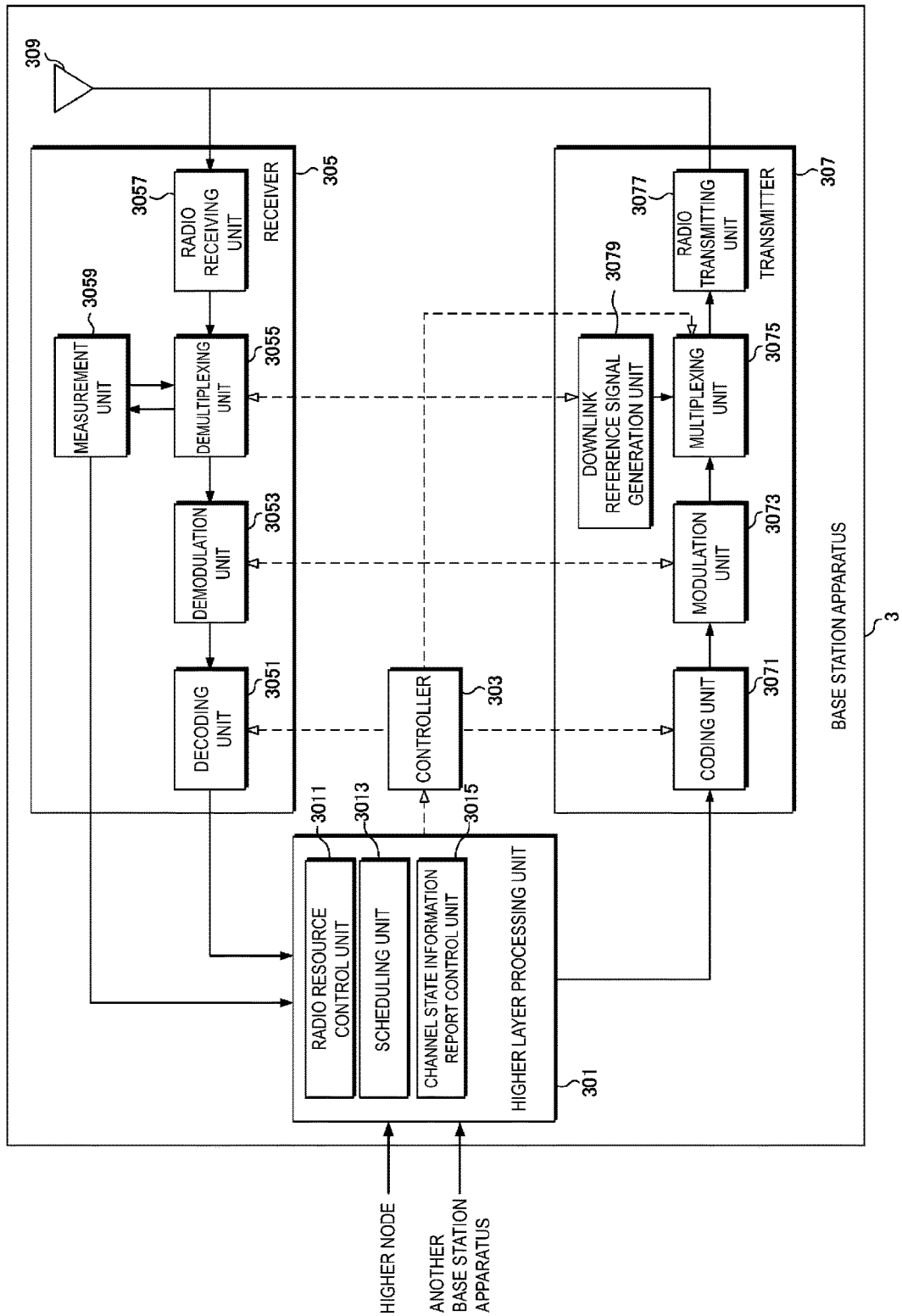
FIG. 10 is a schematic block diagram illustrating a configuration of a base station apparatus 3 according to the present embodiment.

FIG. 10 is a schematic block diagram illustrating a configuration of the base station apparatus 3 according to the present embodiment. As is illustrated, the base station apparatus 3 is configured to include a higher layer processing unit 301, a controller 303, a receiver 305, a transmitter 307, and a transmit and/or receive antenna 309. The higher layer processing unit 301 includes a radio resource control unit 3011, a scheduling unit 3013, and a CSI report control unit 3015. The receiver 305 includes a decoding unit 3051, a demodulation unit 3053, a demultiplexing unit 3055, a radio receiving unit 3057, and a measurement unit 3059. The transmitter 307 includes a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. The higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, the downlink data (the transport block) allocated in the downlink PDSCH, system information, the RRC message, the MAC Control Element (CE), and the like, and outputs the result of the generation or the acquirement to the transmitter 307, The radio resource control unit 3011 manages various configuration information for each of the terminal apparatuses 1.

The scheduling unit 3013 included in the higher layer processing unit 301 determines a frequency and a subframe to which the physical channels (PDSCH or PUSCH) are allocated, the transmission coding rate and modulation scheme for the physical channels (PDSCH or PUSCH), the transmit power, and the like, from the received CSI and from the channel estimate value, channel quality, or the like input from the measurement unit 3059. The scheduling unit 3013 generates the control information for control of the receiver 305 and the transmitter 307 in accordance with a result of the scheduling, and outputs the generated information to the controller 303. The scheduling unit 3013 generates the information (for example, the DCI format) to be used for the scheduling of the physical channels (PDSCH or PUSCH), based on the result of the scheduling.

The CSI report control unit 3015 included in the higher layer processing unit 301 controls a CSI report to be performed by the terminal apparatus 1. The CSI report control unit 3015 transmits information, assumed in order for the terminal apparatus 1 to derive RI/PMI/CQI in the CSI reference resource, for indicating various configurations, to the terminal apparatus 1 through the transmitter 307.

Based on the control information from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes a reception signal received from the terminal apparatus 1 through the transmit and/or receive antenna 309, and outputs inthrmation resulting from the decoding to the higher layer processing unit 301. The radio receiving unit 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 3057 removes a portion corresponding to the Guard Interval (GI) from the digital signal resulting from the conversion. The radio receiving unit 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio receiving unit 3057 into PUCCH, PUSCH, and the signal such as the uplink reference signal. The demultiplexing is performed based on radio resource allocation information, predetermined by the base station apparatus 3 using the radio resource control unit 3011, that is included in the uplink grant notified to each of the terminal apparatuses 1. The demultiplexing unit 3055 performs channel compensation of the PUCCH and the PUSCH, based on the channel estimate value input from the measurement unit 3059. The demultiplexing unit 3055 outputs an uplink reference signal resulting from the demultiplexing, to the measurement unit 3059.

The demodulation unit 3053 performs Inverse Discrete Fourier Transform (IDFT) on the PUSCH, obtains modulation symbols, and performs reception signal demodulation, that is, demodulates each of the modulation symbols on the PUCCH and the PUSCH, in compliance with the modulation scheme determined in advance, such as Binary Phase Shift Keying (BPSK), QPSK, 16 QAM, 64 QAM, 256 QAM, or in compliance with the modulation scheme that the base station apparatus 3 itself notified in advance with the uplink grant to each of the terminal apparatuses 1. The demodulation unit 3053 demultiplexes the modulation symbols of multiple pieces of uplink data transmitted on the same PUSCH by using the MIMO SM, based on the number of spatially multiplexed sequences notified in advance with the uplink grant to each of the terminal apparatuses 1 and information for indicating the precoding to be performed on the sequences.

The decoding unit 3051 decodes the coded bits of the PUCCH and the PUSCH, which have been demodulated, in compliance with a predetermined coding scheme by using the transmission or original coding rate that is predetermined or notified in advance with the uplink grant to the terminal apparatus 1 by the base station apparatus 3, and outputs the decoded uplink data and uplink control information to the higher layer processing unit 101. In a case that the PUSCH is retransmitted, the decoding unit 3051 performs the decoding with the coded bits input from the higher layer processing unit 301 and retained in a HARQ buffer, and the demodulated coded bits. The measurement unit 3059 measures the channel estimate value, the channel quality, and the like, based on the uplink reference signal input from the demultiplexing unit 3055, and outputs the measurement result to the demultiplexing unit 3055 and the higher layer processing unit 301.

The transmitter 307 generates the downlink reference signal in accordance with the control signal input from the controller 303, codes and modulates the downlink control information and the downlink data that are input from the higher layer processing unit 301, multiplexes the PDCCH, the PDSCH, and the downlink reference signal and transmits a signal resulting from the multiplexing to the terminal apparatus 1 through the transmit and/or receive antenna 309 or transmits the PDCCH, the PDSCH, and the downlink reference signal to the terminal apparatus 1 through the transmit and/or receive antenna 309 by using separate radio resources.

The coding unit 3071 codes the downlink control information and the downlink data input from the higher layer processing unit 301. The modulation unit 3073 modulates the coded bits input from the coding unit 3071, in compliance with a modulation scheme such as BPSK, QPSK, 16 QAM, 64 QAM, and 256 QAM.

The downlink reference signal generation unit 3079 generates, as the downlink reference signal, a sequence known to the terminal apparatus 1, the sequence being determined in accordance with a predetermined rule based on the physical cell identity (PCI) for identifying the base station apparatus 3, or the like.

The multiplexing unit 3075, in accordance with the number of PDSCH layers to be spatially multiplexed, maps one or multiple pieces of downlink data to be transmitted in one PDSCH to one or multiple layers, and performs preceding to the one or multiple layers. The multiplexing unit 3075 multiplexes the downlink physical channel signal and the downlink reference signal for each transmit antenna port. The multiplexing unit 3075 maps the downlink physical channel signal and the downlink reference signal to the resource elements for each transmit antenna port.

The radio transmitting unit 3077 performs Inverse Fast Fourier Transform (IFFT) on the modulation symbol resulting from the multiplexing or the like, performs the modulation in compliance with an OFDM scheme, adds the guard interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up converts) the signal of the intermediate frequency into a signal of a high frequency signal, removes unnecessary frequency components, performs power amplification, and outputs a final result to the transmit and/or receive antenna 309 for transmission.

(1) More specifically, a terminal apparatus 1 according to a first aspect of the present invention includes; a receiver configured to receive a physical downlink control channel for conveying downlink control information including a first information field; and a transmitter configured to report channel state information (CSI), wherein the first information field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (BWP) of the first serving cell.

(2) A base station apparatus 3 according to a second aspect of the present invention includes; a transmitter configured to transmit a physical downlink control channel for conveying downlink control information including a first information field; and a receiver configured to receive a channel state information (CSI) report, wherein the first information field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (BWP) of the first serving cell.

(3) A communication method according to a third aspect of the present invention is a communication method for a terminal apparatus, the communication method including the steps of: receiving a physical downlink control channel for conveying downlink control information including a first information field; and reporting channel state information (CSI), wherein the first information field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (BWP) of the first serving cell.

(4) A communication method according to a fourth aspect of the present invention is a communication method for a base station apparatus, the communication method including the steps of: transmitting a physical downlink control channel for conveying downlink control information including a first information field; and reporting channel state information (CSI), wherein the first information field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (BWP) of the first serving cell.

(5) An integrated circuit according to a fifth aspect of the present invention is an integrated circuit mounted on a terminal apparatus, the integrated circuit including: a receiving unit configured to receive a physical downlink control channel (PDCCH) for conveying downlink control information (DCI) including a first information field (CSI request field); and a transmitting unit configured to report channel state information (CSI), wherein the first information field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (BWP) of the first serving cell.

(6) An integrated circuit according to a sixth aspect of the present invention is an integrated circuit mounted on a base station apparatus, the integrated circuit including: a transmitting unit configured to transmit a physical downlink control channel (PDCCH) for conveying downlink control information (DCI) including a first information field (CSI request field); and a receiving unit configured to receive a channel state information (CSI) report, wherein the first information field indicates first information, the first information indicates one of multiple states, each of the multiple states is associated with: a configuration related to one or multiple CSI reports; and a configuration related to one or multiple CSI resources, and the one of the multiple states is configured to be associated with a first serving cell and a bandwidth part (BWP) of the first serving cell.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. The "computer-readable recording medium" may be any of a semiconductor recording medium, an optical recording medium, a magnetic recording medium, a medium dynamically retaining the program for a short time, or any other computer readable recording medium.

Each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. In a case that with advances in semiconductor technology, a circuit integration technology appears that replaces the present integrated circuits, it is also possible to use a new integrated circuit based on the technology according to one or more aspects of the present invention.

Note that, in the embodiments according to the present invention, examples have been described in which the present invention is applied to a communication system constituted by a base station apparatus and a terminal apparatus, but the present invention can also be applied in a system in which terminals communicate each other such as Device to Device (D2D).

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. A configuration in which constituent elements, described in the respective embodiments and having mutually the same effects, are substituted for one another is also included in the technical scope of the present invention.

The invention claimed is:

1. A terminal apparatus comprising:
an upper layer processing circuitry configured to receive a configuration list related to a channel state information (CSI) report and information related to a trigger of the CSI report;
a reception circuitry configured to receive, via a physical downlink control channel (PDCCH), downlink control information (DCI) including a CSI request field; and
a transmission circuitry configured to transmit the CSI report based on the CSI request field, wherein
the transmission circuitry is configured to transmit a CSI report of an activated downlink bandwidth part (BWP) related to the CSI request field in a case that the CSI report is triggered and the downlink BWP is active,
the transmission circuitry is further configured not to transmit a CSI report of a deactivated downlink BWP, in a case that the CSI report is triggered and the downlink BWP is inactive,
the configuration list related to the CSI report indicates a plurality of CSI trigger states,
the information related to the trigger of the CSI report indicates a size $N_{TS}$ of the CSI request field in the DCI,
each of code points of the CSI request field is mapped to one of the plurality of CSI trigger states, one of the plurality of CSI trigger states is selected by a medium access control (MAC) processing circuitry of the terminal apparatus in a case that a number of CSI trigger states in the plurality of CSI trigger states is greater than $2^{\wedge}(N_{TS})-1$, the CSI request field directly indicates the selected one of the plurality of CSI trigger states and a Quasi-Co-Location (QCL) assumption in a case that the number of CSI trigger states in the plurality of the CSI trigger states is equal to or less than $2^{\wedge}(N_{TS})-1$, the MAC processing circuitry is configured to give an indication of the selected one of the plurality of CSI trigger states, and one of the plurality of CSI trigger states corresponding to "1" in the indication is mapped to a code point of the CSI request field.

2. A communication method used for a terminal apparatus, the communication method comprising:

receiving a configuration list related to a channel state information (CSI) report and information related to a trigger of the CSI report;

receiving, via a physical downlink control channel (PDCCH), downlink control information (DCI) including a CSI request field; and transmitting the CSI report based on the CSI request field, wherein a CSI report of an activated downlink bandwidth part (BWP) related to the CSI request field is transmitted in a case that the CSI report is triggered and the downlink BWP is active, a CSI report of a deactivated downlink BWP is not transmitted in a case that the CSI report is triggered and the downlink BWP is inactive, the configuration list related to the CSI report indicates a plurality of CSI trigger states, the information related to the trigger of the CSI report indicates a size $N_{TS}$ of the CIS request field in the DCI, each of code points of the CSI request field is mapped to one of the plurality of CSI trigger states, one of the plurality of CSI trigger states is selected by a medium access control (MAC) processing circuitry of the terminal apparatus in a case that a number of CSI trigger states in the plurality of CSI trigger states is greater than $2^{\wedge}(N_{TS})-1$, the CSI request field directly indicates the selected one of the plurality of CSI trigger states and a Quasi-Co-Location (QCL) assumption in a case that the number of CSI trigger states in the plurality of the CSI trigger states is equal to or less than $2^{\wedge}(N_{TS})-1$, the MAC processing circuitry is configured to give an indication of the selected one of the plurality of CSI trigger states, and one of the plurality of CSI trigger states corresponding to "1" in the indication is mapped to a code point of the CSI request field.

3. A base station apparatus comprising:

an upper layer processing circuitry configured to transmit a configuration list related to a channel state information (CSI) report and information related to a trigger of the CSI report;

a transmission circuitry configured to transmit, via a physical downlink control channel (PDCCH), downlink control information (DCI) including a CSI request field; and a reception circuitry configured to receive the CSI report based on the CSI request field, wherein the reception circuitry is configured to receive a CSI report of an activated downlink bandwidth part (BWP) related to the CSI request field in a case that the CSI report is triggered and the downlink BWP is active, the reception circuitry is further configured not to receive a CSI report of a deactivated downlink BWP, in a case that the CSI report is triggered and the downlink BWP is inactive, the configuration list related to the CSI report indicates a plurality of CSI trigger states, the information related to the trigger of the CSI report indicates a size $N_{TS}$ of the CSI request field in the DCI, each of code points of the CSI request field is mapped to one of the plurality of CSI trigger states, one of the plurality of CSI trigger states is selected by a terminal apparatus in a case that a number of CSI trigger states in the plurality of CSI trigger states is greater than $2^{\wedge}(N_{TS})-1$, the CSI request field directly indicates the selected one of the plurality of CSI trigger states and a Quasi-Co-Location (QCL) assumption in a case that the number of CSI trigger states in the plurality of the CSI trigger states is equal to or less than $2^{\wedge}(N_{TS})-1$, and one of the plurality of CSI trigger states corresponding to "1" in the indication is mapped to a code point of the CSI request field in a case of indication of the selected one of the plurality of CSI trigger states.

* * * * *